R. B. CRAIG.
TIME RECORDER.
APPLICATION FILED JAN. 24, 1913. RENEWED APR. 2, 1914.

1,098,484.

Patented June 2, 1914.

WITNESSES:
R. E. Hamilton
L. J. Fischer

INVENTOR:
Robert B. Craig,
BY
F. G. Fischer,
ATTORNEY

R. B. CRAIG.
TIME RECORDER.
APPLICATION FILED JAN. 24, 1913. RENEWED APR. 2, 1914.

1,098,484.

Patented June 2, 1914.

WITNESSES:

INVENTOR:
Robert B. Craig,
BY
ATTORNEY.

R. B. CRAIG.
TIME RECORDER.
APPLICATION FILED JAN. 24, 1913. RENEWED APR. 2, 1914.

1,098,484.

Patented June 2, 1914.
5 SHEETS—SHEET 4.

WITNESSES:
R. E. Hamilton
L. J. Fischer

INVENTOR:
Robert B. Craig,
BY
F. G. Fischer,
ATTORNEY

COLUMBIA PLANOGRAPH CO., WASHINGTON, D. C.

R. B. CRAIG.
TIME RECORDER.
APPLICATION FILED JAN. 24, 1913. RENEWED APR. 2, 1914.

1,098,484.

Patented June 2, 1914.

WITNESSES:

INVENTOR:
Robert B. Craig,
BY
ATTORNEY.

UNITED STATES PATENT OFFICE.

ROBERT B. CRAIG, OF KANSAS CITY, MISSOURI, ASSIGNOR TO CHAMPION RECORDING MACHINE COMPANY, OF GRAND RAPIDS, MICHIGAN, A CORPORATION OF SOUTH DAKOTA.

TIME-RECORDER.

1,098,484.  Specification of Letters Patent.  Patented June 2, 1914.

Application filed January 24, 1913, Serial No. 743,985. Renewed April 2, 1914. Serial No. 829,141.

*To all whom it may concern:*

Be it known that I, ROBERT B. CRAIG, citizen of the United States, residing at Kansas City, in the county of Jackson and State of Missouri, have invented certain new and useful Improvements in Time-Recorders, of which the following is a specification.

This invention relates to time recorders, of the class in which the records are printed by types carried by rotative wheels.

The herein described time recorder has a wide range of utility, being adapted for: stamping time checks in factories, billiard and pool halls; for dating all kinds of documents, such as insurance policies, orders for merchandise, et cetera, and for recording the time of issue upon street-car transfer slips.

The object of the invention is to provide a perpetual time recorder that will simultaneously print minutes, hours, days, months and years; that will automatically shift from the last day of every month to the first day of the following month; and that will automatically give the month of February 29 days in leap-years.

A special object of the invention is to provide a mechanism the motive power of which is furnished solely by the spring of the controlling clock; all other motive springs employed being simply accumulators of power derived from the cock spring. One advantage of this feature is that there is at most only one spring to be wound by hand, and if the clock be of any self-winding type even this operation will be dispensed with.

In order that the invention may be fully understood, reference will now be made to the accompanying drawings, in which:—

Figure 2:
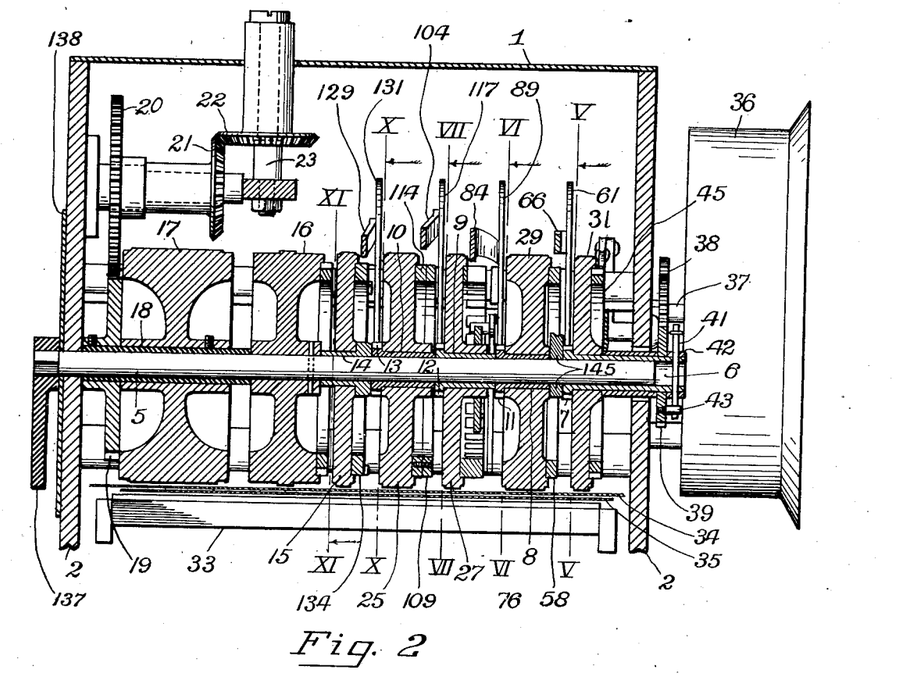
Fig. 2 is a vertical sectional view on a line II—II of Fig. 1, the platen being shown in elevation.

The mechanism as shown is mounted in a housing of which 1 indicates the top, and 2 the end plates. Fig. 2 omits the lower part of the housing, which may be supported on a bracket, a table, or any other surface. The plates 2 are rigidly connected and braced by tubular rods 3 and 3'. 4, is a stationary bar whose ends are also fixed in the housing plates.

The type-wheels, hereinafter designated, are mounted indirectly upon a shaft 5, which may be either rotatable or not. As shown it is rotatable, its ends being journaled in plate 2 and in a bracket 145, secured to a block 146 that is secured to the opposite plate 2.

Rotatably mounted on the shaft 5 are a series of sleeve hubs, 6, 8, 9 and 10, which have respectively thereon, integral pinions, 7, 11, 12 and 13. Mounted fixedly upon the respective hubs 6, 8 and 9, are three type-wheels namely, the minute-wheel, the hour-wheel, and the day-wheel. Abutting the hub 10 is a sleeve hub 14, on which is a type-wheel 15, namely the year-wheel. At the left of the year-wheel 15 are shown two additional recording wheels 16 and 17. Wheel 16 is fixedly mounted on the shaft. Wheel 17 is mounted on a sleeve 18 which is rotatable on the shaft and holds the wheel 16 from endwise motion. Wheels 16 and 17 may be provided with raised types (not shown) which may print other data than time data, if additional data be required. Wheel 17 may be set through the medium of gears 19, 20, 21, 22, and a projecting shaft 23.

Fixedly mounted on main shaft 5 is a combined turning arm and pointer, 137, which may be used for turning the recording wheel 16. The position of said pointer may be referred to marks on a dial 138, thus indicating what will be printed by recording wheel 16.

On the periphery of the year-wheel 15 are a series of raised types 24, adapted to print the last two figures of the current year and of future years: thus, 14 indicates 1914, 15 indicates 1915. The number of years characters placed upon this wheel is a matter of judgment. On the periphery of the month-wheel, 25, are a series of raised types 26 adapted to print the abbreviated names of each month of the year. On the periphery of the day-wheel, 27, are a series of thirty-one raised types 28 adapted to print the numerals from 1 to 31 consecutively, indicating the day of the month. On the periphery of the hour-wheel, 29, are a series of twenty four raised types 30 adapted to print hourly for twenty-four hours, with the suffixes "A. M." for the first twelve and the suffix "P. M." for the second twelve. On the periphery of the minute wheel, 31, are a series of raised types 32 adapted to print minutes. It is not necessary in some cases or for some uses that this wheel be provided with sixty characters; and in the drawings I have shown types suitable for printing three-minute intervals, this requiring only twenty characters on the wheel.

Below the row of type-wheels named is a vertically movable platen 33, which is actuated upward by a spring or weight (not shown) and is depressible by a hand lever or a pedal, not shown. The inking device consists of an ink-bearing ribbon 34, which may be mounted on spools or otherwise.

35 designates a piece of paper in position to receive a record, by being pressed into contact with the ribbon 34 and against the types.

36, is a fixedly mounted case containing a clock movement, which has a projecting arbor 37 on which is a gear wheel 38 which drives an idle gear 39 that drives a gear wheel 40, loosely mounted on the hub 6. Fixed upon said hub by a pin 41 is a collar 42 which retains the wheel 40 in place. Pin 41 has projecting ends, one of which engages a stud 43 on wheel 40; the other end of said pin is connected with said wheel by a pull-spring 44 which normally holds the stud in contact with said pin. The minute wheel 31, being fixedly mounted on hub 6, is continuously rotated by the (spring driven) clock movement and makes one revolution per hour.

Fixed to one face of the minute wheel 31 is an annulus 45 which has an equally spaced series of notches 46, equal in number to the types 32. As the minute-wheel type will seldom be in exact printing position at a given moment, a position-correcting device is necessary. As shown, this comprises a pawl 47, adapted to engage the notches 46 and turn the type-wheel backward; a holding pawl 48; a spring 49 for actuating the pawl 47 and means for returning the latter to starting position. The pawl 47 rests on a stud 50 and is pivotally connected to the rock-arm 51, 53. Arm 52 bears upon a bell-crank lever 53. Spring 49 is attached to a fixed rod 54. Holding pawl 48 engages any notch 46, as shown, and is mounted on a fixed rod 55 and is urged by a spring 56, attached to rod 54. Normally, the annulus 45 will rotate in a clockwise direction without contact by the correcting pawl 47. The stop-pawl 48 is positioned to arrest the type-wheel when the proper type is in exact printing position. Normally the bell-crank lever 53 is held in the position shown, thus restraining the pawl 47. Rod 57 is connected with a pedal (not shown) that depresses the platen 33 and rod 57 simultaneously and imparts a full stroke to said rod, lever 53, arms 51, 52, and pawl 47. The reverse movement will again expand the pawl-spring 49.

When the type-wheel 31 is moved backward by the correcting pawl 47, the spring 44 will be stretched and pin 41 will leave the stud 43, the said wheel will be stopped by pawl 48 from further backward motion, being then in printing position. The spring 44 by its yielding prevents said motion from turning the clock-driven gears 38, 39. While an impression or record is being made, the aforesaid hand lever or pedal will be held down, so that the type-wheel 31 shall be held in a printing position, while the platen 33 will be released automatically from its actuating parts and driven upward by a spring (not shown). The minute-wheel 31 is geared to make one revolution per hour.

Figure 5:
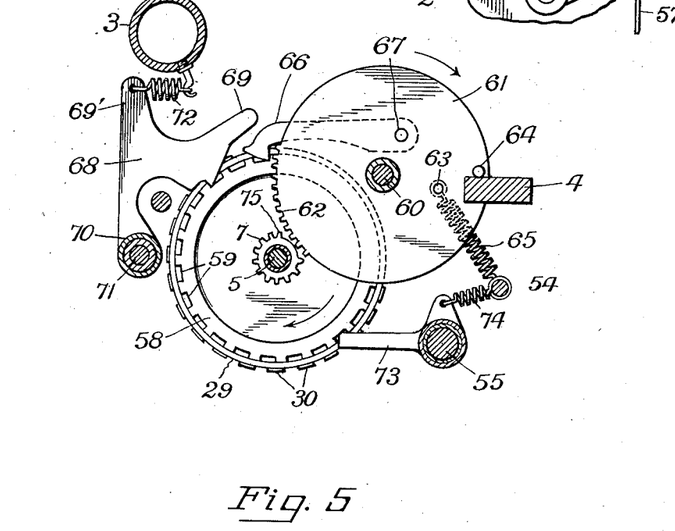
Fig. 5 is a sectional elevation of the hour-wheel mechanism, sectioned on a line V—V of Fig. 2.

The next printing wheel in order, with its actuating mechanism, is shown in Fig. 5. This wheel 29 has an automatic setting mechanism. An annulus 58, having as many notches 59 as there are types 30, is fixedly mounted on said wheel. On a shaft 60, which is journaled in the frame-plates 2 (Fig. 1) is a wheel 61 having a gear segment 62 thereon, adapted to be driven by the pinion 7, which has sufficient of its teeth cut away to permit the segment 62 to pass clear of it when at a certain position. The pinion 7 is driven by the minute-wheel 31, which is fixedly mounted on the pinion hub 6. On the wheel 61 are an eccentric pin 63 and a stop-stud 64. A spring 65, connected to pin 63, tensions the wheel in the direction of the arrow, and the stud 64, by striking the bar 4, limits the movement of the wheel by the spring. The setting pawl 66 is pivotally mounted on a crankpin 67 on said wheel, and is adapted to engage the notches 59, as shown. 68 is a holding pawl, having a nose 69 adapted for actuation by pawl 66. Pawl 68 is pivoted on a collar 70 mounted on a rod 71, shown entire in Fig. 3. Pawl 68 is pressed forward by a spring 72, attached to the stationary tube 3. 73, is a spring-actuated holding pawl which engages a notch 59, is mounted on the rod 55, and has a tension spring 74.

Operation: The pinion 7 is continuously turned, arrow-wise, by the means already described. When the pinion's end tooth 75 engages the gear segment 62 the latter will begin to rotate and will be turned by the pinion until the recess in the pinion permits the gear to turn freely. The gear-driven motion of the wheel 61 causes pawl 66 to pass from one notch 59 to the next, and in this movement the pawl disengages dog 68 from annulus 58. The instant the pinion 7 releases the gear 62, the spring 65 snaps the pawl-wheel and pawl back, causing the hour-wheel 29 to turn one step, thus bringing the next type into printing position; said wheel being there held by the combined engagement of pawls 68 and 66. As the pinion 7 rotates once each hour, and is adjusted to release the pawl-wheel at the end of the hour, the hour type will be changed at such times. The lower pawl 73 serves to hold the type-wheel 29 from turning during the time when both the upper pawls 66, 68 are disengaged from the notches.

Figures 6, 7, 8, 9, 12:
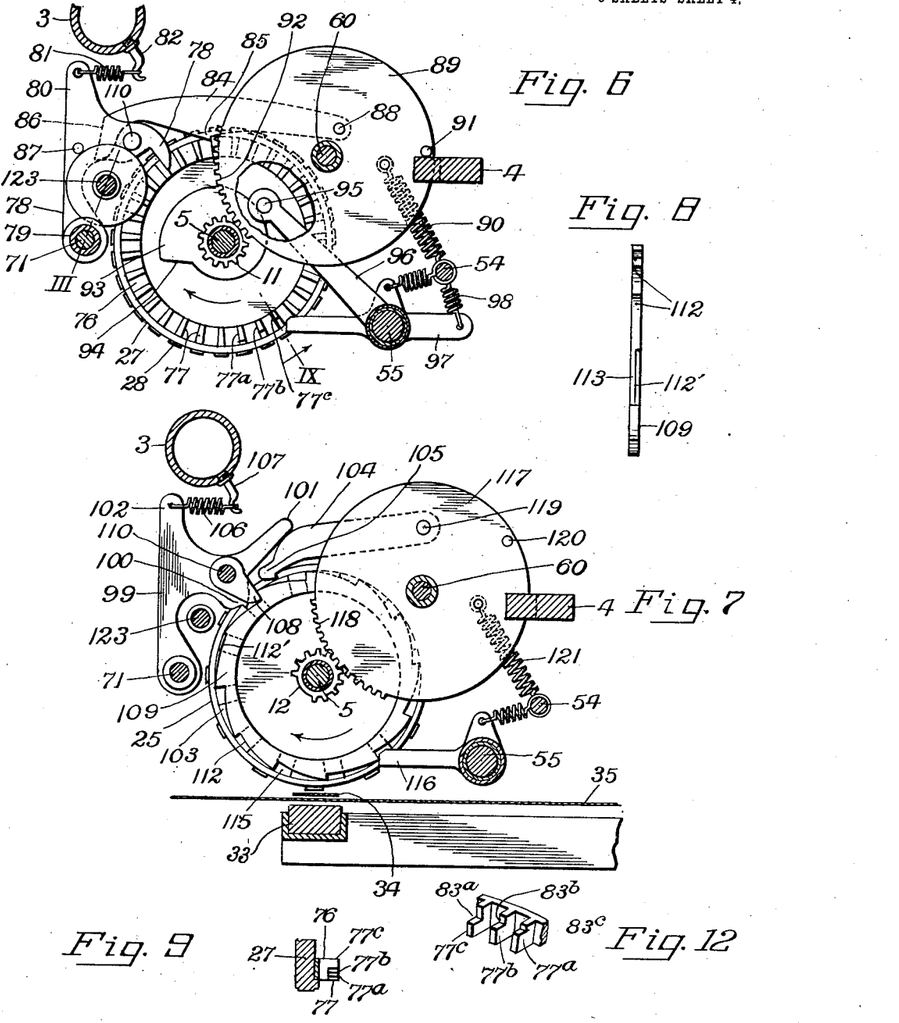
Fig. 6 is a sectional elevation of a part of the day-wheel mechanism, sectioned on a line VI—VI of Fig. 2.
Fig. 7 is a sectional elevation of a part of the month-wheel and day-wheel mechanisms, sectioned on a line VII—VII of Fig. 2.
Fig. 8 is an edge view of a cam 109, detached.
Fig. 9 is a detail section, on a line IX of Fig. 6.
Fig. 12 is a perspective view of the modified teeth on the day-wheel.

The next printing wheel in order, with its driving mechanism, is shown in Fig. 6. This wheel prints the days of the month, and by reason of the variation in the number of days in the months, I have devised an automatic mechanism which will cause the day of the month to be correctly recorded throughout a year or any number of years. The type-wheel shifting is performed by a spring-actuated pawl, and the said variations are provided for by an arrangement of graduated modified teeth on the type-wheel, in coaction with a year-cam which revolves once per year and has twelve month divisions which successively control the manner in which the shift-pawl engages the said teeth. As before stated, the day-wheel 27 is mounted on a sleeve hub 9 which is not visible in Fig. 6. The pinion 11 seen in this figure is that carried by the adjacent sleeve hub 8. Fixed upon one face of the type-wheel 27 is an annulus 76 having an equally spaced series of thirty-one laterally projecting teeth, 77, corresponding with the thirty-one consecutive printing types 28 on the wheel 27. 78, is a detent, pivoted on a sleeve 79 mounted on rod 71. Said detent has a lug 80 to which is connected a pull-spring 81, attached to hook 82 mounted on the tubular frame-rod 3. The motion of the point of detent 78 is approximately radial relative to the toothed ring 76. The depth of engagement of the detent at all times of the year is governed by the action of a mechanism shown in Fig. 6 and which will presently be described.

Three of the teeth, $77^a$, $77^b$ and $77^c$, have parts thereof cut away, as best shown by Fig. 12. The recesses $83^a$, $83^b$, and $83^c$ are unequal in depth, the one in advance being the smallest, the following one slightly deeper, and the third slightly deeper than the second. It is obvious that a detent might stop the tooth $77^a$ without being in a position to stop the next tooth $77^b$, or might be moved so as to stop the tooth $77^b$ without being in position to stop the third tooth $77^c$. The operation desired is to automatically turn the day-wheel at the end of each month to the numeral 1: making a normal step if the month has thirty-one days, a double step if thirty days, a triple step if twenty-nine days, and a still longer step if twenty-eight days. The pawl 84 that steps the type-wheel engages the teeth 77 by its point 85, and has an extension 86, adapted to engage a pin 87 on the detent 78 when actuated. Said pawl 84 is connected to a crankpin 88 on a wheel 89, on shaft 60. A spring 90 actuates the wheel and pawl in one direction and holds a stop 91 on the wheel against the fixed bar 4. Wheel 89 is provided with a gear segment 92, adapted to be driven by the mutilated pinion 11 whose hub extends through the hour-wheel. Fixedly mounted on the hub of the day-wheel 27 is a cam 93, having an abrupt fall 94 therein. Said cam is constantly engaged by a pin or roller 95 carried by an arm 96, integral with an arm 97 to which is connected a pull-spring 98 attached to the rod 54. The cam-fall 94 is designed to be actuated by the spring-pressed pin or roller 95, and the motion thus imparted to the type-wheel at the end of a month is sufficient to change the types from 28 to 1 almost instantaneously. The pawl 84 changes the types from day to day, excepting at the end of months having less than thirty-one days. The cam-fall 94 is set to begin to be driven, at midnight of the 28th day of each month. If the month has thirty-one days, one of the teeth 77 will strike the detent 78 at the end of one normal step of the wheel. If the month has thirty days, the detent 78 will be held high enough that the tooth marked $77^c$ will pass said detent, thus permitting the wheel to be turned two steps or from 30 to 1 type by the members 98, 97, 96, 95, 93, the wheel being arrested at the proper point by said detent, which throws in as soon as the pin 87 is released by the pawl end 86. Supposing the month to have only twenty-eight days, the detent 78 will be held so high that all of the modified teeth will pass it, whereby the wheel will be shifted instantly from 28 type to 1 type. At each preliminary stroke of the pawl 84, the extension 86 will actuate pin 87 thereby freeing detent 78 from the tooth engaged thereby. The recording wheel will then be turned, either by said pawl 84 or by the spring-actuated cam device above described. The control for said detent will now be described, referring to Figs. 6 and 7.

A pawl body 99 is pivotally mounted on rod 71, and has a pawl point 100, a nose 101, and a lug 102. The point 100 engages a notched annulus 103 on a month-wheel 25; the nose 101 is adapted to be lifted by a hump 104 on a pawl 105; the lug 102 is tensioned forward by a spring 106, attached to a hook 107 on tube 3. A stud 110 is fixed in the detent 78 and projects to the left (see Fig. 1). Fixedly mounted on the end of said stud is a lug 108, which rides upon a cam ring 109, which is fixedly mounted upon the annulus 103. The periphery of ring 109 is cut into twelve equally spaced, ratchet shaped notches, 112, 112' which have various depths, but all for 30 day months have the same depth, and all for 31 day months have the same depth. The February notch 112' is the shallowest. This notch is cut only half-way through the thickness of the ring, as shown in Fig. 8; the uncut segment 113 having the arcuate surface upon which the lug 108 may rest if shifted into alinement therewith. Annulus 103 has twelve equal and equally spaced notches 115, one of which is normally engaged by a spring-pressed dog 116, mounted pivotally on rod 55. The pawl point 105 normally engages another of said notches 115, as shown in Fig. 7. It is apparent that the resting position of the day-wheel detent 78 is governed by that of the lug 108, which depends on the depth of the notch in which said lug rests. The operation of the day-printing mechanism will now be fully understood.

The month-printing mechanism comprises, in addition to the parts already mentioned, a driving and releasing pinion 12, a wheel 117 having a gear segment 118 thereon and a crank-pin 119 to actuate the pawl 104, a stop-pin 120, and a spring 121 to actuate said wheel reversely. The pinion 12 is driven by the day-wheel 27. At a certain point in every revolution of the day-wheel 27, said pinion will release the gear segment 118, whereupon the spring 121 will retract the shift-pawl 104 which will advance the month-wheel 25 one step (one month).

Figure 1:
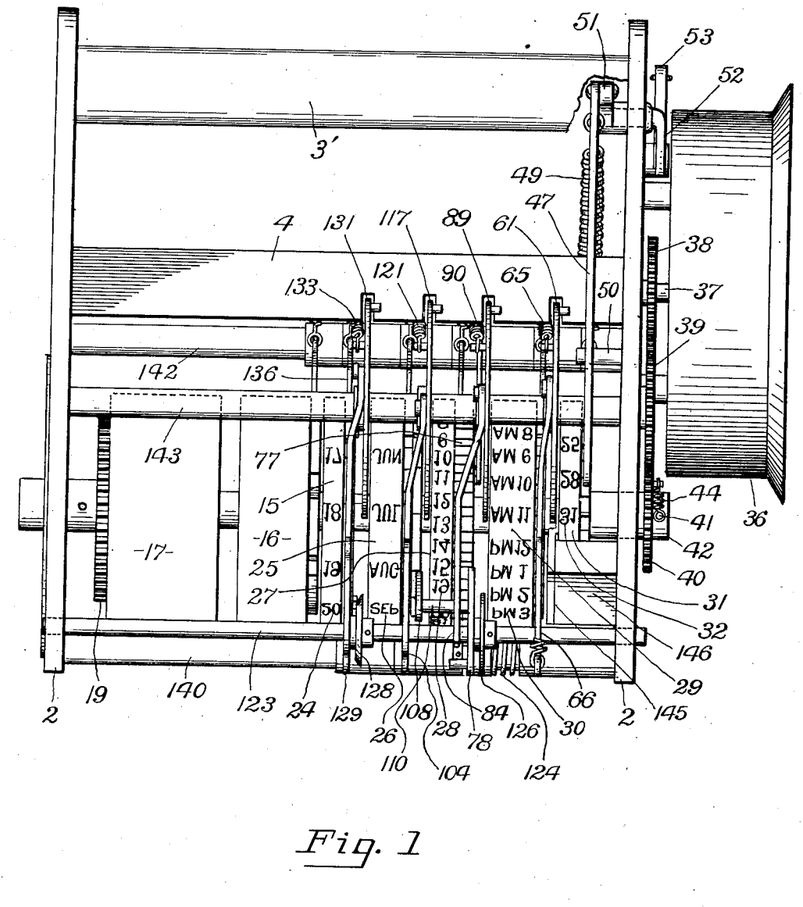
Figure 1 is a top plan view of a six-wheel mechanism embodying the invention, omitting a frame rod 3.
Figure 3:
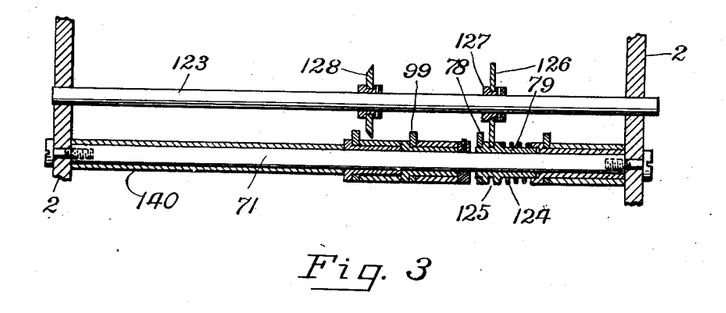
Fig. 3 is a sectional view of certain details, taken on a line III—III of Fig. 6.
Figure 4:
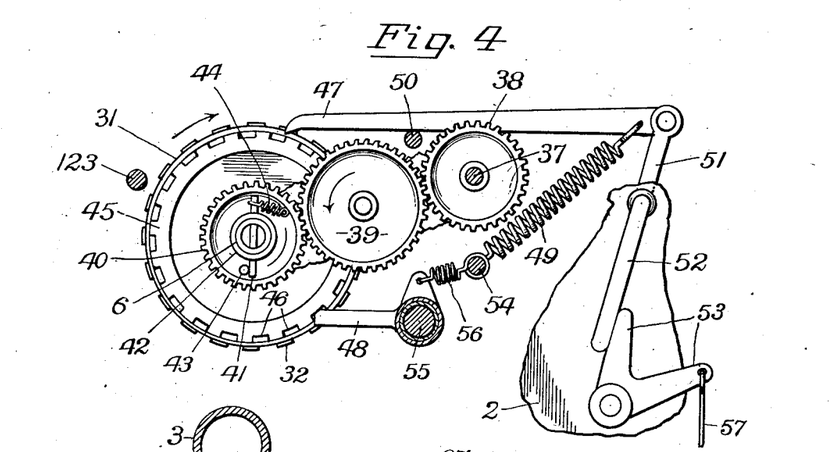
Fig. 4 is an end elevation of the minute-wheel mechanism, certain rods being in section.

The next recording group is that containing the year-wheel, 15. See Fig. 10. This wheel is mounted on a sleeve as shown in Fig. 2, but may be placed directly on the shaft 5. Said wheel carries an annulus 134 in which are a number of notches 134ª, preferably twelve or more. For every four of these notches I provide a leap-year lug 122, which lugs project from one side of the ring and are adapted to act, once every four years, upon the lug 108. The mechanism shown for effecting this is illustrated in Figs. 1, 3 and 6. As shown in Fig. 3, a longitudinal rod 123 is slidably mounted in the frame ends 2, in proximity to the stationary rod 71. The sleeve 79, which carries the detent 78, is made slidable on rod 71 and is urged leftward by a helical spring 124. In said sleeve is an annular groove 125, into which extends the rim of a disk 126, having a hub 127 fixedly mounted on the slide-rod. To provide for the lateral shifting of the detent 78 and lug 108, the teeth 77 and the cam 109 are given extra width, as may be seen in Fig. 1. Fixedly mounted on rod 123, just in the path of the leap-year lugs 122, is a disk 128, having its periphery beveled on the side facing said lugs 122. Normally the spring 124 holds the sleeve 79, rod 123, and disks 126, 128 at their leftward positions. In Figs. 1 and 3 the parts are shown as shifted for leap-year, in order to give February 29 days. This is effected in part by the shifting of lug 108 to the right on cam 109, at the end of a year preceding a leap-year. This motion will permit said lug to drop into the recess 112' whereby its position will be lower than in other years. Hence, at the end of February in leap-year, the type-wheel 27 will be advanced one step and no more, thus presenting the type "29" the next step being to "1" for March. The lug 122 will hold the pawls or detents in the same position, sidewise, until the year-wheel 15 is advanced by its pawl 129 on the first day of the following year. Until that time, the mechanism will operate the same as in other than leap-years. Completing the description of the parts shown in Fig. 10, the pawl 129 is connected to a crankpin 130 on a wheel 131, on shaft 60. Said wheel is provided with a gear segment 132, the driving pinion 13 of which is turned by the month-wheel 25 and releases the gear segment at the proper time. The spring 133 actuates the pawl 129. The notched annulus 134 and the holding pawls 135 and 136 have the same functions as in the other groups.

Figures 10, 11:
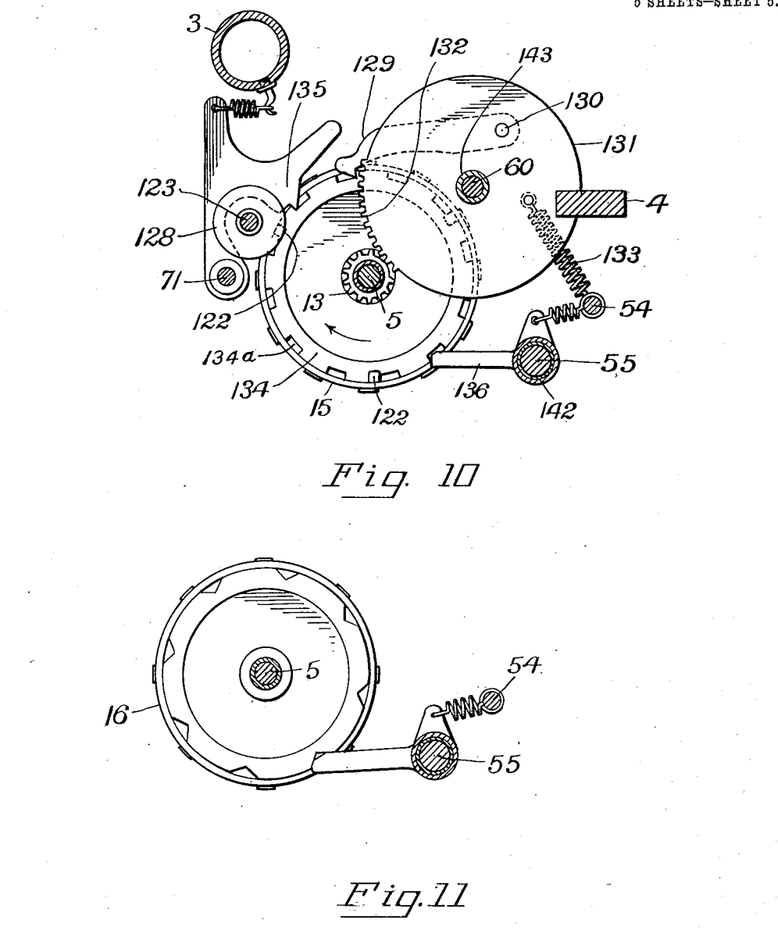
Fig. 10 is a sectional elevation of the year-wheel mechanism, sectioned on a line X—X of Fig. 2.
Fig. 11 is an end elevation of an extra recording wheel and a pawl thereto.

At the end of the term of years for which the type-wheel 15 is designed, a new year-wheel may be substituted therefor. Fig. 11 illustrates one form of holding device for the extra recording wheel 16. Its operation will be evident without description.

Having thus described my invention, I claim, and desire to secure by Letters Patent:

1. A day-printing mechanism comprising a day-wheel, an annular member carried thereby having 31 teeth, a stop pawl normally projecting between said teeth, several of said teeth being modified for variable engagement with said pawl, and time-controlled means to advance said wheel at the end of each month and to vary the position of said pawl.

2. A day-printing mechanism comprising a day-wheel, an annular series of 31 teeth carried thereby, a detent normally projecting between said teeth, several of said teeth being modified for variable engagement with said detent, and spring-actuated, time-controlled means to advance said wheel at the end of each month and to vary the position of said detent.

3. A day-printing mechanism comprising a day-wheel, adapted to make one revolution per month; a cam fixedly mounted on said wheel; said cam having a fall corresponding to a four-day motion of the day-wheel and set to start at the end of the 28th day of the month; a spring-actuated rock-arm engaging said cam and adapted to simultaneously advance the cam and the day-wheel; and automatic, time-controlled means to arrest said forward motion at different predetermined points, for the purpose specified.

4. In a time recorder, a day-wheel having 31 characters; a detent for said wheel, means on said wheel engageable by the detent at 31 points, a month-wheel making one revolution per year, a rotatable cam driven by and with said month-wheel, said cam having twelve equally spaced points at varying distances from its center, and means actuated by said cam to control the position of said detent.

5. In a time recorder, a day-wheel making one revolution per month; a detent for said wheel, a series of stops on said wheel engageable by said detent, a month-wheel having twelve characters, a rotary cam driven by and with said month-wheel, said cam having twelve equally spaced notches of varying depth in its periphery, a lug normally riding said cam and adapted to enter each of said notches, and a mechanical connection between said lug and said detent, for governing the operative position of the detent.

6. In a time recorder, a day-wheel having 31 characters, a series of 31 stop-teeth carried by said wheel, an adjustable detent adapted to arrest said wheel at printing positions, said detent being laterally and pivotally shiftable, a month-wheel having 12 characters, a month-cam carried by the month-wheel, means controlled by said cam to vary the angular position of said detent at the ends of certain months, said means comprising a lug having a normal track on said cam, said cam having a leap-year recess opposite its February division and out of the normal track of said lug; a year-wheel having a plurality of characters, thereon, and means actuated prior to the end of February in a leap-year to shift said detent-controlling means whereby the day-wheel will give the said month 29 days.

7. In a time recorder, a year-wheel having a plurality of year types thereon, a leap-year lug on said wheel, a member positioned to be shifted by said lug at leap-year, a rod 71, a sleeve slidable on said rod, an operative connection between said member and sleeve, a spring 129, a member 78 mounted on said sleeve, a stud carried by said member, a lug carried by said stud, a month-wheel making one revolution per year, a month-cam carried by said wheel, said lug having a normal track upon said cam, said cam having a special recess out of the normal track of said lug; said lug and its actuating parts being shifted by the normal forward movement of said leap-year lug.

8. In a time recorder, a shaft, a plurality of type-wheels having different periods of rotation and mounted on said shaft, a mutilated pinion concentric with and driven by each type-wheel, a gear segment intermittently driven by each pinion, a pawl initially actuated by each gear segment, means on each type-wheel for step-by-step driving by said pawls, springs for operating said pawls, and a clock movement geared to the type-wheel having the quickest period of rotation.

9. In combination, a minute-wheel, having a series of notches; driving means for said wheel, a correcting-pawl normally disengaged from said notches, a spring for operatively actuating said pawl, a holding pawl, said correcting-pawl being adapted to turn said wheel backward to a correct position; and means permitting such backward motion without disturbing said wheel-driving means.

10. In combination, a time-recording wheel, having a series of notches; a mutilated pinion, a sector gear adapted to mesh with said pinion, a spring tending to hold said gear at one extreme of its movement, a pawl movable by said gear and adapted to turn said wheel by engaging one of said notches, said pawl being so actuated by said spring, and means for driving said pinion.

11. In combination, a time-recording wheel, having a series of thirty-one escapement teeth projecting therefrom; three of said teeth being progressively shortened; a movable detent adapted to hold said wheel by successive engagement with said teeth; a year wheel provided with a twelve-faced cam, means governed by said cam and operatively connected with said detent with respect to said teeth; and spring-actuated means for shifting the recording wheel forwardly.

12. In combination, a recording wheel provided with month characters; a cam ring mounted on and turning with said wheel, said cam ring being formed with twelve peripheral notches of varying depths, the February notch being offset and having a full segment of the cam forming one wall of said notch; a movable lug riding upon the cam periphery which comprises said cam segment; a year recording wheel; a leap-year projection carried by said year recording wheel; means actuated by said projection to shift said lug laterally so as to bring said lug into alinement with said offset notch; a day-recording wheel detent governed in position by said lugs; and automatic means to restore said lug to its normal plane.

In testimony whereof I affix my signature, in the presence of two witnesses.

ROBERT B. CRAIG.

Witnesses:
F. G. FISCHER,
L. J. FISCHER.

Copies of this patent may be obtained for five cents each, by addressing the "Commissioner of Patents, Washington, D. C."